(12) United States Patent
Harish et al.

(10) Patent No.: US 12,428,059 B2
(45) Date of Patent: Sep. 30, 2025

(54) MANUAL LANE BIASING MODE FOR ADAS

(71) Applicant: Atieva, Inc., Newark, CA (US)

(72) Inventors: Sumukha Mysore Harish, San Jose, CA (US); Jinning Jiang, Fremont, CA (US); Sharath Avadhanam, Cupertino, CA (US); Farhad A. Goodarzi, Menlo Park, CA (US)

(73) Assignee: Atieva, Inc., Newark, CA (US)

(*) Notice: Subject to any disclaimer, the term of this patent is extended or adjusted under 35 U.S.C. 154(b) by 241 days.

(21) Appl. No.: 18/449,379

(22) Filed: Aug. 14, 2023

(65) Prior Publication Data
US 2025/0058829 A1    Feb. 20, 2025

(51) Int. Cl.
*B62D 15/02* (2006.01)

(52) U.S. Cl.
CPC ....... *B62D 15/025* (2013.01); *B62D 15/0215* (2013.01)

(58) Field of Classification Search
CPC .. B62D 15/025; B62D 15/0215; B62D 1/286; B60W 50/082; B60W 50/10; B60W 2510/202; B60W 2552/53; B60W 30/12
See application file for complete search history.

(56) References Cited

U.S. PATENT DOCUMENTS

| | | | |
|---|---|---|---|
| 6,076,030 A | 6/2000 | Rowe | |
| 10,081,389 B2 * | 9/2018 | Okuda | B62D 6/00 |
| 10,150,474 B2 | 12/2018 | Sterniak | |
| 10,488,521 B2 | 11/2019 | Wang et al. | |
| 10,634,772 B2 | 4/2020 | Eckstein et al. | |
| 10,705,528 B2 | 7/2020 | Wierzynski et al. | |
| 10,967,854 B2 * | 4/2021 | Kataoka | B60W 30/09 |
| 11,027,764 B2 * | 6/2021 | Chow | B60N 2/0028 |

(Continued)

FOREIGN PATENT DOCUMENTS

| | | |
|---|---|---|
| DE | 102013020334 A1 | 8/2014 |
| EP | 3680877 A1 | 7/2020 |

(Continued)

OTHER PUBLICATIONS

International Search Report and Written Opinion for PCT Application No. PCT/US2024/042101, mailed on Dec. 5, 2024, 16 pages.

(Continued)

*Primary Examiner* — Kurt Philip Liethen
(74) *Attorney, Agent, or Firm* — Brake Hughes Bellermann LLP (57) ABSTRACT

A method comprises: activating a full lane centering control mode in an advanced driver assistance system (ADAS) of a vehicle, wherein in the full lane centering control mode the ADAS keeps the vehicle centered on a trajectory of a lane regardless of surroundings of the vehicle and applies a first torque level against steering input that a driver applies using a steering wheel; detecting, in the full lane centering control mode, a driver input corresponding to a departure from the trajectory; and in response to the driver input, instead activating a manual lane biasing mode in which the ADAS applies a second torque level against the steering input, the second torque level lower than the first torque level, the manual lane biasing mode allowing the driver to steer away from the trajectory.

20 Claims, 4 Drawing Sheets

(56) References Cited

U.S. PATENT DOCUMENTS

| | | | |
|---|---|---|---|
| 11,498,618 B2* | 11/2022 | Aoyama | B62D 15/025 |
| 2005/0240328 A1* | 10/2005 | Shirato | B62D 1/286 |
| | | | 701/1 |
| 2008/0091318 A1* | 4/2008 | Deng | B62D 6/003 |
| | | | 701/41 |
| 2009/0171533 A1* | 7/2009 | Kataoka | B62D 15/025 |
| | | | 701/41 |
| 2009/0299573 A1 | 12/2009 | Thrun et al. | |
| 2011/0224880 A1* | 9/2011 | Baehrle-Miller | B60T 7/085 |
| | | | 701/70 |
| 2012/0166032 A1* | 6/2012 | Lee | B60W 50/08 |
| | | | 701/23 |
| 2013/0338868 A1 | 12/2013 | Essame et al. | |
| 2014/0257628 A1* | 9/2014 | Lee | B62D 15/025 |
| | | | 701/34.4 |
| 2015/0161895 A1 | 6/2015 | You et al. | |
| 2018/0051992 A1 | 2/2018 | Croyle | |
| 2019/0092321 A1* | 3/2019 | Shimizu | B60W 40/08 |
| 2019/0138007 A1 | 5/2019 | Baghsorkhi et al. | |
| 2019/0179311 A1 | 6/2019 | Paden | |
| 2019/0391587 A1 | 12/2019 | Uvarov et al. | |
| 2020/0086486 A1 | 3/2020 | Graichen et al. | |
| 2020/0174492 A1 | 6/2020 | Lee et al. | |
| 2020/0192391 A1 | 6/2020 | Vora et al. | |
| 2020/0198657 A1 | 6/2020 | Manderla et al. | |
| 2022/0289182 A1 | 9/2022 | Kim | |

FOREIGN PATENT DOCUMENTS

| | | |
|---|---|---|
| EP | 3692339 A1 | 8/2020 |
| EP | 3805073 A1 | 4/2021 |
| JP | 2000080673 A | 3/2000 |
| WO | 2006048310 A1 | 5/2006 |
| WO | 2019076044 A1 | 4/2019 |
| WO | 2020011025 A1 | 1/2020 |
| WO | 2020206071 A1 | 10/2020 |

OTHER PUBLICATIONS

Lu, et al., "Impedance Control for Blending Driver and Automated Steering Commands in Lane Following Maneuvers", 2022 IEEE 17th International Conference on Control & Automation (ICCA), 2022, p. 716-721.

D. Ren et al.: "Trajectory Planning for Vehicle Lane Changing on Circular Road in Automated Highway System," IOSR Journal of Electrical and Electronics Engineering (IOSR-JEEE), vol. 14, Issue 6 Ser. I (Nov.-Dec. 2019), pp. 25-37.

H. Bai et al.: "Accelerated Lane-Changing Trajectory Planning of Automated Vehicles with Vehicle-to-Vehicle Collaboration," Hindawi, Journal of Advanced Transportation, vol. 2017, Article ID 8132769, 12 pages, https://doi.org/10.1155/2017/8132769.

Intellias: "Solving the Challenges of HD Mapping for Smart Navigation in Autonomous Cars," Blogpost, available online at: <https://www.intellias.com/solving-the-challenges-of-hd-mapping-for-smart-navigation-in-autonomous-cars/>, May 12, 2020, 9 pages.

* cited by examiner

MANUAL LANE BIASING MODE FOR ADAS

TECHNICAL FIELD

This document relates to a manual lane biasing mode for an advanced driver assistance system (ADAS).

BACKGROUND

Some existing systems for driver assistance provide lane centering. Such systems are configured to keep the vehicle centered in the lane regardless of the surroundings of the vehicle. The system may disengage if the driver makes a sufficient input using the steering wheel, and would then typically take a stipulated time, and a set of entry conditions to be met, to re-engage and continue functioning. These prior approaches do not provide any operation mode designed for the situation where the driver may occasionally want to bias/maneuver the vehicle according to its present surroundings, while maintaining the lane centering system engaged. As such, the experience of the system may be discontinuous, inconsistent and not pleasurable.

SUMMARY

In a first aspect, a method comprises: activating a full lane centering control mode in an advanced driver assistance system (ADAS) of a vehicle, wherein in the full lane centering control mode the ADAS keeps the vehicle centered on a trajectory of a lane regardless of surroundings of the vehicle and applies a first torque level against steering input that a driver applies using a steering wheel; detecting, in the full lane centering control mode, a driver input corresponding to a departure from the trajectory; and in response to the driver input, instead activating a manual lane biasing mode in which the ADAS applies a second torque level against the steering input, the second torque level lower than the first torque level, the manual lane biasing mode allowing the driver to steer away from the trajectory.

Implementations can include any or all of the following features. Detecting the driver input comprises detecting that the steering input has a third torque level greater than the first torque level. Detecting the driver input comprises detecting a capacitive signal at the steering wheel. Detecting the driver input comprises detecting a delta between a steering wheel angle and a road wheel angle. Operating the ADAS in the full lane centering control mode comprises applying a first control intensity to steering of the vehicle, and wherein operating the ADAS in the manual lane biasing mode comprises applying a second control intensity to the steering of the vehicle, the second control intensity lower than the first control intensity. In the first control intensity the ADAS generates a lane centering control output $u_{ctrl}$ for the steering of the vehicle, and wherein in the second control intensity the ADAS applies a controller command $U_{final}$ that in part depends on the lane centering control output $u_{ctrl}$. The controller command $U_{final}$ equals a weighted sum of the lane centering control output $u_{ctrl}$ and $u_d$, the steering input, plus an auxiliary term $u_{epsilon}$. The controller command $U_{final}$ equals $u_d$, the steering input, multiplied by a factor $K_d$, plus an auxiliary term $u_{epsilon}$. The controller command $U_{final}$ equals a weighted sum of the lane centering control output $u_{ctrl}$ and $u_d$, the steering input. Activating the manual lane biasing mode allows the driver to steer away from the trajectory while the ADAS applies the second torque level against the steering input. Activating the manual lane biasing mode allows the driver to perform a lane change, wherein the ADAS defines a new trajectory. The method further comprises detecting, after activating the manual lane biasing mode, that the vehicle reaches a threshold distance from the trajectory, and applying, in response to the detection of the threshold distance, a third torque level against the steering input, the third torque level greater than the second torque level. The third torque level is higher than the first torque level. The method further comprises subsequently deactivating the manual lane biasing mode and instead activating the full lane centering control mode. The deactivation of the manual lane biasing mode and the activation of the full lane centering control mode is performed in response to detecting that the driver is no longer steering the vehicle away from the trajectory. The deactivation of the manual lane biasing mode and the activation of the full lane centering control mode is performed in response to detecting that the vehicle is currently traveling toward the trajectory. The method further comprises subsequently deactivating the manual lane biasing mode and instead activating a manual control mode where neither of the manual lane biasing mode or the full lane centering control mode is activated. The deactivation of the manual lane biasing mode and the activation of the manual control mode is performed in response to the steering input exceeding a torque threshold. The deactivation of the manual lane biasing mode and the activation of the manual control mode is performed in response to the driver deactivating lane centering.

In a second aspect, a vehicle comprises: a road wheel; a steering wheel coupled to the road wheel; a steering control including an actuator for the road wheel; and an advanced driver assistance system (ADAS), the ADAS implemented using a processor executing instructions, the ADAS coupled to the steering control and configured to operate in: a full lane centering control mode in which the ADAS keeps the vehicle centered on a trajectory of a lane regardless of surroundings of the vehicle and applies a first torque level against steering input from a driver; and a manual lane biasing mode in which the ADAS applies a second torque level against the steering input, the second torque level lower than the first torque level, the manual lane biasing mode allowing the driver to steer away from the trajectory.

BRIEF DESCRIPTION OF DRAWINGS

Like reference symbols in the various drawings indicate like elements.

DETAILED DESCRIPTION

This document describes examples of computer-implemented systems and techniques for an ADAS to control a vehicle using a manual lane biasing mode. A manual lane biasing mode can be implemented to estimate the driver's intention to manually bias and/or maneuver the vehicle within the current driving lane boundaries while a standard lane centering control is active. The system can honor this intention while applying a reduced control intensity. The driver and the driving assist system can together achieve the common goal of a smooth maneuver while providing a pleasant driving experience. The present subject matter can be incorporated along with (e.g., integrated with, or implemented for conjunct operation with) a standard lane centering system in a vehicle. The system can assist the driver's intentions while staying active and continuously seeking to steer towards the lane center, resulting in a smooth and continuous experience. Implementations of the present subject matter can provide flexibility by being agnostic of both the high-level lane centering and the low-level steering controller implementation. Implementations of the present subject matter can facilitate a time-invariant consistency of system resistance to honor driver intentions throughout the maneuver. As such, the present subject matter can provide a seamless driving experience during maneuvers, and/or a smoother transitioning from lane centering to manual driving. In some implementations, shared control can be provided for a lane keeping system.

Examples described herein refer to a vehicle. A vehicle is a machine that transports passengers or cargo, or both. A vehicle can have one or more motors using at least one type of fuel or other energy source (e.g., electricity). Examples of vehicles include, but are not limited to, cars, trucks, and buses. The number of wheels can differ between types of vehicles, and one or more (e.g., all) of the wheels can be used for propulsion of the vehicle. The vehicle can include a passenger compartment accommodating one or more persons. At least one vehicle occupant can be considered the driver; various tools, implements, or other devices, can then be provided to the driver. In examples herein, any person carried by a vehicle can be referred to as a "driver" or a "passenger" of the vehicle, regardless whether the person is driving the vehicle, or whether the person has access to controls for driving the vehicle, or whether the person lacks controls for driving the vehicle. Vehicles in the present examples are illustrated as being similar or identical to each other for illustrative purposes only.

Examples herein refer to an ADAS. Assisted driving involves at least partially automating one or more dynamic driving tasks by way of computer-based operations (e.g., by a processor executing instructions). An ADAS can perform assisted driving and is an example of an assisted-driving system. Assisted driving is performed based in part on the output of one or more sensors typically positioned on, under, or within the vehicle, which is sometimes referred to as the ego vehicle. An ADAS can plan one or more trajectories for a vehicle before and/or while controlling the motion of the vehicle. A planned trajectory can define a path for the vehicle's travel. As such, propelling the vehicle according to the planned trajectory can correspond to controlling one or more aspects of the vehicle's operational behavior, such as, but not limited to, the vehicle's steering angle, gear (e.g., forward or reverse), speed, acceleration, and/or braking.

While an autonomous vehicle is an example of a system that performs assisted driving, not every assisted-driving system is designed to provide a fully autonomous vehicle. Several levels of driving automation have been defined by SAE International, usually referred to as Levels 0, 1, 2, 3, 4, and 5, respectively. For example, a Level 0 system or driving mode may involve no sustained vehicle control by the system. For example, a Level 1 system or driving mode may include adaptive cruise control, emergency brake assist, automatic emergency brake assist, lane-keeping, and/or lane centering. For example, a Level 2 system or driving mode may include highway assist, autonomous obstacle avoidance, and/or autonomous parking. For example, a Level 3 or 4 system or driving mode may include progressively increased control of the vehicle by the assisted-driving system. For example, a Level 5 system or driving mode may require no human intervention of the assisted-driving system.

Figure 1:
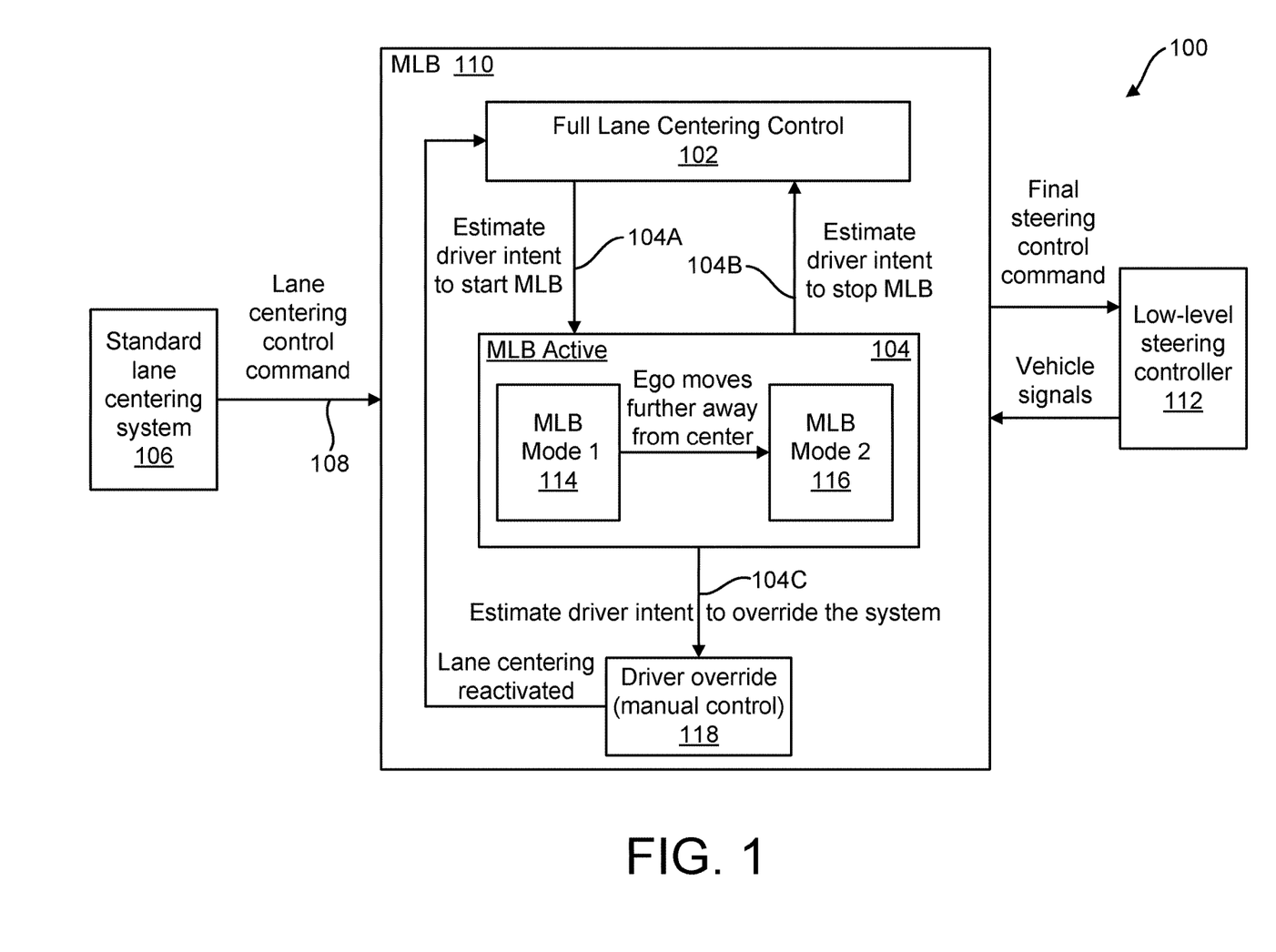
FIG. 1 shows a block diagram of an example of a system that can operate in a full lane centering control mode or in a manual lane biasing mode.

FIG. 1 shows a block diagram of an example of a system 100 that can operate in a full lane centering control mode 102 or in a manual lane biasing (MLB) mode 104. Each component of the system 100 can be implemented using at least one processor executing instructions stored in a computer-readable medium. The system 100 or any component thereof can be used with one or more other examples described elsewhere herein.

The system 100 can be implemented in a vehicle to support the performance of one or more functions of an ADAS of the vehicle. In some implementations, the ADAS can include a standard lane centering system 106. The manual lane biasing mode 104 can be activated for providing additional assistance to the driver in some situations. The standard lane centering system 106 can generate a lane centering control output in form of a lane centering control command 108 that is provided to a manual lane biasing component 110. When the system 100 operates according to the full lane centering control mode 102, the lane centering control command 108 is used by a low-level steering controller 112 of the vehicle to control the steering. For example, the low-level steering controller 112 is a steering control that includes an actuator for a road wheel of the vehicle. The operation of the manual lane biasing mode 104 is agnostic to the implementation details of the standard lane centering system 106 as well as to those of the low-level steering controller 112. For example, the manual lane biasing mode 104 can operate with different types of the lane centering control command 108, as well as to provide different types of a final steering control command for the low-level steering controller 112.

When the full lane centering control mode 102 has been activated, the ADAS keeps the vehicle centered on a trajectory of a lane regardless of surroundings of the vehicle. In particular, as part of the full lane centering control mode 102 the ADAS controls the steering with a particular amount of resistance against driver steering input that a driver applies using a steering wheel. In some implementations, the ADAS applies a first torque level against the driver's steering input. The driver perceiving this can recognize that it takes more torque to rotate the steering wheel than when the full lane centering control mode 102 is not active.

Figure 2:
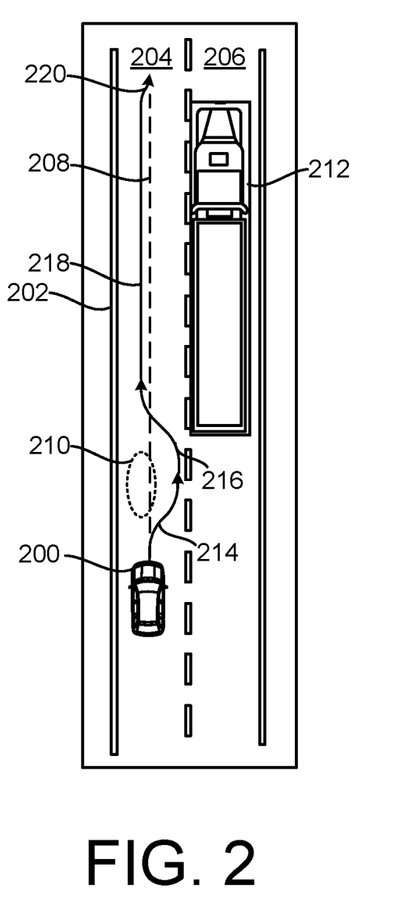
FIGS. 2-3 show examples involving a vehicle traveling on a roadway.

A few examples will now be described with reference to both FIG. 1 and some of the subsequent drawings. FIG. 2 shows examples involving a vehicle 200 traveling on a roadway 202. Any of the examples can be used with one or more other examples described elsewhere herein.

The roadway 202 is here depicted from above and includes lanes 204 and 206 having traffic flowing in a single direction, of which the vehicle 200 is currently traveling in the lane 204. In other implementations, the roadway 202 can instead have more or fewer lanes, and/or can have two-lane traffic.

The vehicle 200 has an ADAS that is currently operating in the full lane centering control mode 102. That is, the vehicle 200 can have the standard lane centering system 106, and the lane centering control command 108 currently controls the steering. The ADAS defines a trajectory 208 that extends in the roadway 202 (currently inside the lane 204). The trajectory 208 is here schematically shown as a dashed line and can have any shape (e.g., straight or curved) depending on the output of a motion planner in the ADAS. As mentioned, when the full lane centering control mode 102 is solely responsible for controlling the steering, the vehicle 200 will be steered so as to center on the trajectory 208.

However, while driving (e.g., during highway driving), the driver may sometimes like to steer the vehicle away from the trajectory 208 (which trajectory may coincide with the lane center of the lane 204) to avoid certain situations. For example, road deterioration 210 can exist in the lane 204, either as damage to the roadway or as the presence of debris thereon. As another example, a large vehicle 212 (e.g., a truck) in the lane 206 can encroach on the available space for the vehicle 200. The driver may still desire the lane centering system to remain active while avoiding the temporary situation.

The system 100 can activate the manual lane biasing mode 104 in response to detecting a driver input corresponding to a departure from the trajectory 208. This is schematically illustrated as a state transition 104A in FIG. 1. For example, the system 100 can enter the manual lane biasing mode 104 when the driver's intention of biasing the vehicle is detected. The manual lane biasing mode 104 is an addition to the standard lane centering system 106. For example, the manual lane biasing mode 104 can only be activated when the full lane centering control mode 102 is active.

In some implementations, detecting the driver input comprises detecting that the steering input has a torque level greater than the first torque level with which the system resists driver steering input during the full lane centering control mode 102. The driver may turn the steering wheel with increased torque in order to avoid the road deterioration 210 or the large vehicle 212. The vehicle 200 may be equipped with electronic power steering applied to a steering shaft. A torsion bar torque in the shaft can be used in determining the entry (and exit) conditions to the manual lane biasing mode 104.

In some implementations, detecting the driver input also or instead comprises detecting a capacitive signal at the steering wheel. The steering wheel may have one or more capacitive sensors configured for detecting the driver's hand(s) and determine whether, and the degree to which, the driver is grasping the steering wheel. For example, changes in where the capacitance is detected and/or the amount of detected capacitance can be taken into account. When the capacitive signal indicates that the driver is actively biasing the steering, the manual lane biasing mode 104 can be activated.

During the manual lane biasing mode 104, the system can honor the driver's steering commands and also continue to provide a non-intrusive but perceivable amount of resistant torque towards the lane center, to make the driver aware that the system is still active and ready to resume full control when exit conditions are detected. During active lane centering and under normal driving conditions without driver intervention, the measured electronic power steer torque can normally remain low (e.g., less than about 0.5 newton-meter (Nm)). With driver intervention, the electronic power steer torque on the torsion bar increases as the lane centering system rejects any inputs to it. By monitoring the build-up of the electronic power steer torque above a threshold ($MLB_{start}$) over a period, the system can estimate the driver's intentions of wanting to command the vehicle. The threshold can also be adjusted for transitioning between straight and curved road sections.

In some implementations, the ADAS applies a different torque level against the steering input in the manual lane biasing mode 104 than in the full lane centering control mode 102. The torque level of the manual lane biasing mode 104 can be lower than the torque level in the full lane centering control mode 102. For example, the manual lane biasing mode 104 allows the driver to steer away from the trajectory 208 while feeling a consistent resistance towards the direction of lane center. This can allow the driver to smoothly maneuver within the lane and/or to drive at a laterally biased position for any desired duration of time. For example, the driver can perform this biasing of the vehicle steering with the awareness that the system is still active and ready to resume full lane centering control whenever completed. As such, in the full lane centering control mode 102 the ADAS can apply a first control intensity to steering of the vehicle 200. In the manual lane biasing mode 104 the ADAS can apply a second control intensity to the steering of the vehicle 200, the second control intensity lower than the first control intensity.

As such, during the manual lane biasing mode 104 the driver can bias the steering to steer the vehicle 200 in one or more directions other than the trajectory 208. Here, the driver can steer the vehicle 200 on a path 214 to avoid the road deterioration 210. For example, the driver can then steer the vehicle 200 on a path 216 to return to approximately the trajectory 208.

As another example, the path 216 can also or instead address the temporary presence of the large vehicle 212. At its end, the path 216 allows the vehicle 200 to travel along a path 218 that is laterally further away from the large vehicle 212 than is the trajectory 208. As such, the driver can obtain an increased lateral separation for as long as necessary. The driver can then steer the vehicle 200 on a path 220 to return to approximately the trajectory 208.

Figure 3:
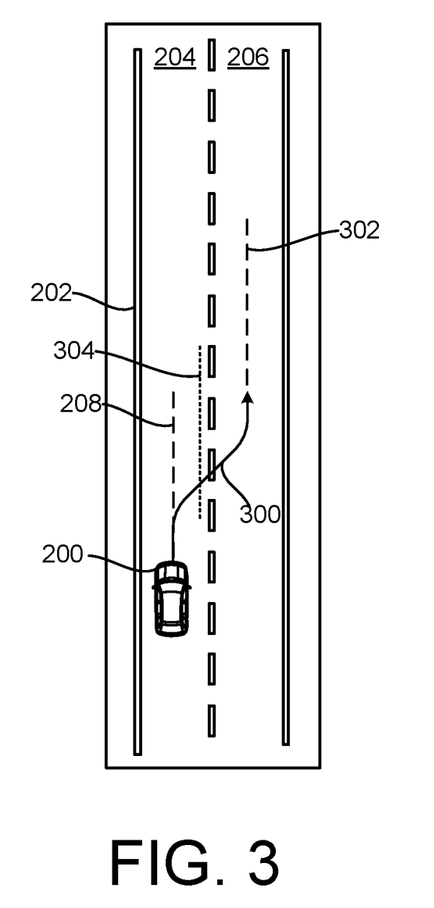

FIG. 3 shows other examples involving the vehicle 200 traveling on the roadway 202. Any of the examples can be used with one or more other examples described elsewhere herein. In some implementations, during the manual lane biasing mode 104 the driver can steer the vehicle 200 on a path 300 away from the trajectory 208 while the ADAS applies the different torque level against the steering input. Here, the path 300 leaves the lane 204 and enters the lane 206. As such, activating the manual lane biasing mode 104 can assist the driver in performing a lane change. The ADAS can then define a new trajectory 302. For example, the new trajectory 302 can be located within the lane 206.

In some implementations, more than one torque level can be applied during the manual lane biasing mode 104. With reference again to FIG. 1, the manual lane biasing mode 104 can include a sub-mode 114 in which a second torque level is applied against the steering input. The sub-mode 114 can correspond to a region before the vehicle 200 crosses a lateral threshold from the lane center. In some implementations, the ADAS can determine that the vehicle 200, biased by the driver against the second torque level, reaches a threshold distance 304 from the trajectory 208. In response, the manual lane biasing mode 104 can enter a sub-mode 116 in which another torque level, different from the second torque level, is applied against the steering input. The sub-mode 116 can correspond to any lateral offset beyond the threshold ($MLB_{dist}$), until exiting from manual lane biasing all-together. This can provide the flexibility of having different levels of control input reduction at different stages of the manual lane biasing mode 104. For example, system control input can be greatly reduced for the sub-mode 114 so that it is easier for the driver to steer away to a bias position, and then increase system control during the sub-mode 116 to keep the driver aware of the system control engagement. The length of the threshold distance 304 can be based on the width of the roadway 202, or on the width of the lane 204, or on the width of the vehicle 200, or can be an absolute number, to name just a few examples. Upon the vehicle 200 reaching the threshold distance 304, the ADAS can apply the other torque level. For example, the other torque level can be higher than the second torque level.

The manual lane biasing mode 104 can be customized for driver preference. In some implementations, a user interface can be integrated for user input to control one or more parameters of the manual lane biasing mode 104. In some implementations, the manual lane biasing mode 104 can be learning-based and can adapt based on monitoring or tracking the user's interactions.

Figure 4:
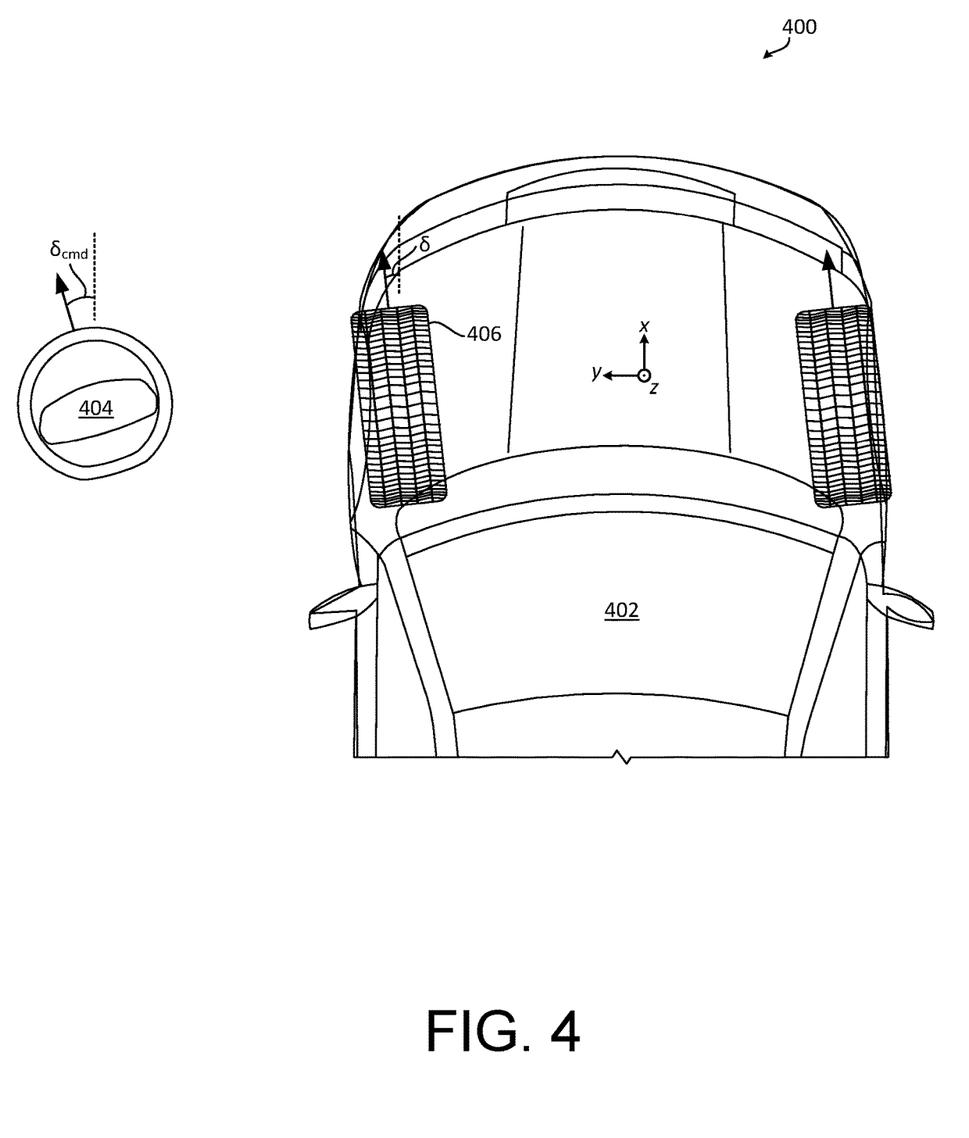
FIG. 4 schematically shows an example of a steering-wheel input command and an effective road angle.

Some examples relating to operation within the manual lane biasing mode 104 will now be described. FIG. 4 schematically shows an example 400 of a steering-wheel input command and an effective road angle. The example 400 can be used with one or more other examples described elsewhere herein. The example 400 involves a vehicle 402 (of which only a front portion is shown for simplicity) and a steering wheel 404 of the vehicle 402 (the steering wheel shown separately from the vehicle 402 for clarity). The vehicle 402 has one or more wheels 406 (schematically illustrated with regard to the vehicle 402) that can be steered using the steering wheel 404. For example, a driver and/or an ADAS controls the steering wheel 404 to generate a steering-wheel input command corresponding to an angle $\delta_{cmd}$ between the steering wheel 404 and a longitudinal reference direction. The wheels 406, moreover, can form an angle $\delta$ with the longitudinal reference direction by turning about a rotation axis in the z direction (extending out of the drawing) as indicated by the coordinate system. The angles $\delta_{cmd}$ and & can be used in determining when to enter the manual lane biasing mode 104. For example, detecting a driver input can include detecting a delta between the angles $\delta_{cmd}$ and $\delta$.

The control logic used during lane biasing can be based on a weighted sum. The control logic can reduce a lane centering control output $u_{ctrl}$ by a factor of $K_{ctrl}$ and, in the meantime, introduce a feedforward open loop command based on a driver input $u_d$ scaled with a factor of $K_d$. The lane centering control output $u_{ctrl}$ can be a function of deviation, road curvature and system parameters. The driver input $u_d$ can be estimated via steering angle, angle rate, torque, and/or capacitive sensing. Either or both of $K_{ctrl}$ or $K_d$ can be a static or dynamic scaling factor. An auxiliary term $u_{epsilon}$ in the same direction of the lane centering control $u_{ctrl}$ can be applied. The control input $u_{ctrl}$ is generic and can be extended to other techniques involving components of feedback and integral action on the lateral and heading deviations, and feedforward on the road curvature. The final controller command can be:

$$U_{final} = K_{ctrl} \cdot u_{ctrl} + K_d \cdot u_d + u_{epsilon}.$$

That is, the controller command $U_{final}$ can equal a weighted sum of the lane centering control output $u_{ctrl}$ and $u_d$, the steering input, plus the auxiliary term $u_{epsilon}$. When the manual lane biasing mode 104 is not activated and the full lane centering control mode 102 is activated, the lane centering control output $u_{ctrl}$ can control the vehicle. By contrast, when the manual lane biasing mode 104 is activated the final controller command $U_{final}$ can control the vehicle.

Reduction of control $u_{ctrl}$ by the factor $K_{ctrl}$ can be performed to enhance driver feel, as it reduces the opposing torque on the steering when in the manual lane biasing mode 104. So, if desired, it is possible to completely disable lane centering control ($K_{ctrl}=0$) during the manual lane biasing mode 104 and provide auxiliary control only. The controller command $U_{final}$ can then equal $u_d$, the steering input, multiplied by the factor $K_d$, plus the auxiliary term $u_{epsilon}$. The resistance torque can then be consistent with lateral offset from the center. Alternatively, it is also possible to disable the auxiliary control ($u_{epsilon}=0$) and provide scaled lane centering control only. The controller command $U_{final}$ can then equal a weighted sum of the lane centering control output $u_{ctrl}$ and $u_d$, the steering input. The resistance torque can then increase with lateral offset through the $u_{ctrl}$ component.

The feedforward control $u_d$ can be used in knowing the driver's motives during the manual lane biasing mode 104. A highway assist system of the ADAS can remain active through the manual lane biasing mode 104, and the low-level steering controller 112 (FIG. 1) can be designed to honor only the output electronically provided by the software stack. The driver's manual inputs can hence be disregarded leading to the driver feeling a strong resistive torque on the steering wheel when trying to manually bias. With the addition of the feedforward control, the software now also commands the low-level controller with an input proportional to the driver's intentions. One of the ways to estimate the driver command $u_d$ is from the driver's steering angle inputs by the linear relation mapping road wheel angle to the steering wheel angle.

The auxiliary control $u_{epsilon}$ can be added to provide constant force feedback to the driver during the manual lane biasing mode 104, irrespective of the lateral bias. In the event of calibrating $K_{ctrl}$ to be zero, the auxiliary control can provide the needed constant feel to the driver.

The following example relates to the choice of scaling factors and relates to calibration. The torsion bar torque in the steering system can have the following proportionality $$\tau \times (\theta_{Swa} - \theta_{PinionAngle}),$$

where $\theta_{Swa}$ is analogous to the driver inputs and $\theta_{PinionAngle}$ is analogous to the controller inputs. In the absence of driver inputs on the system and ignoring the friction and damping of the steering column, the torsion bar in the steering just experiences the torque due to the controller. Without the above scaling of the driver and the controller commands during the manual lane biasing mode 104 ($K_d$ and $K_{ctrl}$ respectively), if the driver wants to manually steer, the driver may have to exert a larger amount of steering effort to reach the same override threshold of the system.

During the manual lane biasing mode 104, however, while the controller input is scaled down by a factor $K_{ctrl}$, driver command $u_d$ is also honored as an additive component to the final command. The torque on the torsion bar due to the controller is reduced. It is hence possible for the driver to apply a significantly lesser amount of steering effort to see the vehicle's reaction. The optimum values of the scaling factors can be determined based on the amount of driver torque that can be honored, while still making it comfortable for the driver to continue to stay laterally biased.

Referring again to FIG. 1, the system can exit the manual lane biasing mode 104 in either of multiple ways. A state transition 104B schematically illustrates that the system can exit the manual lane biasing mode 104 by returning to the full lane centering control mode 102. A state transition 104C schematically illustrates that the system can exit the manual lane biasing mode 104 by a driver override 118. For example, the driver override 118 can correspond to activation of a manual control mode where neither of the manual lane biasing mode 104 or the full lane centering control mode 102 is activated.

The following can be the conditions for exiting the manual lane biasing mode 104 and resuming the full lane centering control mode 102: 1) detection of the driver intention to release control of steering wheel, and 2) the vehicle is moving back towards the lane center. For example, one or more conditions can be met in response to detecting that the driver is no longer steering the vehicle away from the trajectory. The condition 1 can be satisfied when a reduced measured electronic power steering torque is detected. Once the driver releases the control, since lane centering is still active, the system will gradually bring the vehicle back to the lane centering. As the torque measurement can be noisy and driver applied steering efforts can fluctuate on the road, relying only on torque may cause false early exiting of the manual lane biasing mode 104. An additional condition based on vehicle position in lane, in conjunction to the torque condition, can be considered to assist the driver intention estimation. The additional condition is generic and can be sourced from other inputs as well, such as steering angle rate, vehicle heading change, etc. This design can also reduce jerky transition caused by sudden re-engagement of full lane centering control when vehicle is further away from lane center. An exponential ramp-in of the system command from during the manual lane biasing mode 104 to completely resume the full lane centering control mode 102 can be implemented. For example, this can provide a smooth transition, avoid jerky steering movements and oscillations of the vehicle.

The following can be the conditions for exiting the manual lane biasing mode 104 and deactivate lane centering completely: 1) detection of the driver's strong intention to take over control through torque measurement greater than predefined driver override threshold, and 2) the lane centering feature is otherwise deactivated. For driver intention detection, the manual lane biasing mode 104 can be closely tied to other common torque-based sub-features of a standard lane centering system. In some implementations, driver hands off detection and driver lateral override detection can be used. For example, the deactivation of the manual lane biasing mode 104 and the activation of the manual control mode can be performed in response to the steering input exceeding a torque threshold. The parameter design can be performed carefully to not affect the performance of other features. Also, thresholds for lateral override end, hands on and end of the manual lane biasing mode 104 can have very similar values, so time hysteresis and other conditions can be added to improve the estimation confidence.

Figure 5:
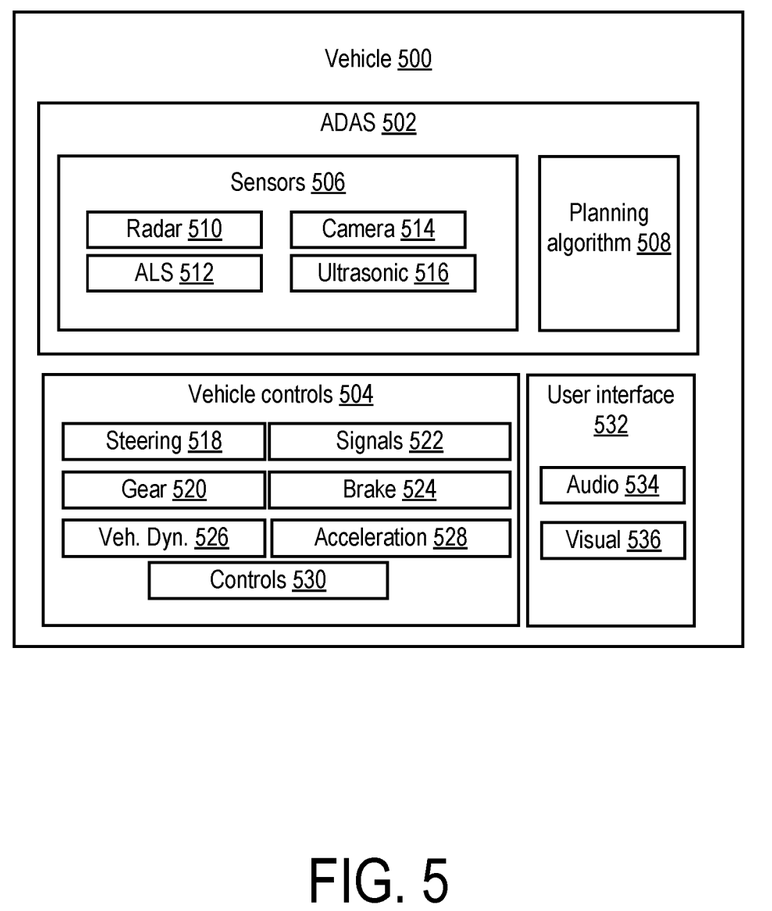
FIG. 5 shows another example of a vehicle.

FIG. 5 shows an example of a vehicle 500. The vehicle 500 can be used with one or more other examples described elsewhere herein. The vehicle 500 includes an ADAS 502 and vehicle controls 504. The ADAS 502 includes sensors 506 and a planning algorithm 508. Other aspects that the vehicle 500 may include, including, but not limited to, other components of the vehicle 500 where the ADAS 502 may be implemented, are omitted here for simplicity.

The sensors 506 are here described as also including appropriate circuitry and/or executable programming for processing sensor output and performing a detection based on the processing. The sensors 506 can include a radar 510. In some implementations, the radar 510 can include any object detection system that is based at least in part on radio waves. For example, the radar 510 can be oriented in a forward direction relative to the vehicle and can be used for detecting at least a distance to one or more other objects (e.g., another vehicle). The radar 510 can detect the surroundings of the vehicle 500 by sensing the presence of an object in relation to the vehicle 500.

The sensors 506 can include an active light sensor 512. In some implementations, the active light sensor 512 can include any object detection system that is based at least in part on laser light or LED light. For example, the active light sensor 512 can include a LiDAR. The active light sensor 512 can be oriented in any direction relative to the vehicle and can be used for detecting at least a distance to one or more other objects (e.g., another vehicle). The active light sensor 512 can detect the surroundings of the vehicle 500 by sensing the presence of an object in relation to the vehicle 500.

The sensors 506 can include one or more cameras 514. In some implementations, the cameras 514 can include any image sensor whose signal(s) the vehicle 500 takes into account. For example, the cameras 514 can be oriented in any of multiple directions relative to the vehicle and can be used for detecting vehicles or other objects, lanes, lane markings, curbs, and/or road signage.

The sensors 506 can include an ultrasonic sensor 516. The ultrasonic sensor 516 can include any device that determines location based on generating and detecting sound waves.

Any of the sensors 506 alone, or two or more of the sensors 506 collectively, can detect, whether or not the ADAS 502 is controlling motion of the vehicle 500, the surroundings of the vehicle 500. In some implementations, at least one of the sensors 506 can generate an output that is taken into account in providing a prompt to a driver, and/or in controlling motion of the vehicle 500. For example, the output of two or more sensors can be combined. In some implementations, one or more other types of sensors can additionally or instead be included in the sensors 506. The ADAS 502 can perform motion planning and/or plan a trajectory for the vehicle 500 based on the output(s) of one or more of the sensors 506.

The vehicle controls 504 can include a steering control 518 (e.g., the low-level steering control 112 in FIG. 1). In some implementations, the ADAS 502 and/or another driver of the vehicle 500 controls the trajectory of the vehicle 500 by adjusting a steering angle of at least one wheel by way of manipulating the steering control 518. The steering control 518 can be configured for controlling the steering angle though a mechanical connection between the steering control 518 and the adjustable wheel, or can be part of a steer-by-wire system.

The vehicle controls 504 can include a gear control 520. In some implementations, the ADAS 502 and/or another driver of the vehicle 500 uses the gear control 520 to choose from among multiple operating modes of a vehicle (e.g., a Drive mode, a Neutral mode, or a Park mode). For example, the gear control 520 can be used to control an automatic transmission in the vehicle 500.

The vehicle controls 504 can include signal controls 522. In some implementations, the signal controls 522 can control one or more signals that the vehicle 500 can generate. For example, the signal controls 522 can control a turn signal and/or a horn of the vehicle 500.

The vehicle controls 504 can include brake controls 524. In some implementations, the brake controls 524 can control one or more types of braking systems designed to slow down the vehicle, stop the vehicle, and/or maintain the vehicle at a standstill when stopped. For example, the brake controls 524 can be actuated by the ADAS 502. As another example, the brake controls 524 can be actuated by the driver using a brake pedal.

The vehicle controls 504 can include a vehicle dynamic system 526. In some implementations, the vehicle dynamic system 526 can control one or more functions of the vehicle 500 in addition to, or in the absence of, or in lieu of, the driver's control. For example, when the vehicle comes to a stop on a hill, the vehicle dynamic system 526 can hold the vehicle at standstill if the driver does not activate the brake control 524 (e.g., step on the brake pedal).

The vehicle controls 504 can include an acceleration control 528. In some implementations, the acceleration control 528 can control one or more types of propulsion motor of the vehicle. For example, the acceleration control 528 can control the electric motor(s) and/or the internal-combustion motor(s) of the vehicle 500.

The vehicle controls 504 can include one or more other controls 530 in addition to those exemplified above.

The vehicle 500 can include a user interface 532. The user interface 532 can include an audio interface 534. In some implementations, the audio interface 534 can include one or more speakers positioned in the passenger compartment. For example, the audio interface 534 can at least in part operate together with an infotainment system in the vehicle.

The user interface 532 can include a visual interface 536. In some implementations, the visual interface 536 can include at least one display device in the passenger compartment of the vehicle 500. For example, the visual interface 536 can include a touchscreen device and/or an instrument cluster display.

Computer-based techniques, processes, components, or systems described herein can be implemented by way of one or more processors executing instructions stored in a non-transitory computer-readable medium.

The examples above illustrate that a vehicle (e.g., the vehicle 500) can include: a road wheel (e.g., the wheel 406 in FIG. 4); a steering wheel (e.g., the steering wheel 404 in FIG. 4) coupled to the road wheel; a steering control (e.g., the low-level steering controller 112 in FIG. 1) including an actuator for the road wheel; an ADAS (e.g., eth ADAS 502 in FIG. 5), the ADAS implemented using a processor executing instructions, the ADAS coupled to the steering control and configured to operate in: a full lane centering control mode (e.g., the full lane centering control mode 102 in FIG. 1) in which the ADAS keeps the vehicle centered on a trajectory of a lane regardless of surroundings of the vehicle and applies a first torque level against steering input from a driver; and a manual lane biasing mode (e.g., the manual lane biasing mode 104 in FIG. 1) in which the ADAS applies a second torque level against the steering input, the second torque level lower than the first torque level, the manual lane biasing mode allowing the driver to steer away from the trajectory.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method comprising:
   activating a full lane centering control mode in an advanced driver assistance system (ADAS) of a vehicle, wherein in the full lane centering control mode the ADAS keeps the vehicle centered on a trajectory of a lane regardless of surroundings of the vehicle and applies a first torque level against steering input that a driver applies using a steering wheel;
   detecting, in the full lane centering control mode, a driver input corresponding to a departure from the trajectory; and
   in response to the driver input, instead activating a manual lane biasing mode in which the ADAS applies a second torque level against the steering input, the second torque level lower than the first torque level, the manual lane biasing mode allowing the driver to steer away from the trajectory.

2. The method of claim 1, wherein detecting the driver input comprises detecting that the steering input has a third torque level greater than the first torque level.

3. The method of claim 1, wherein detecting the driver input comprises detecting a capacitive signal at the steering wheel.

4. The method of claim 1, wherein detecting the driver input comprises detecting a delta between a steering wheel angle and a road wheel angle.

5. The method of claim 1, wherein operating the ADAS in the full lane centering control mode comprises applying a first control intensity to steering of the vehicle, and wherein operating the ADAS in the manual lane biasing mode comprises applying a second control intensity to the steering of the vehicle, the second control intensity lower than the first control intensity.

6. The method of claim 5, wherein in the first control intensity the ADAS generates a lane centering control output $u_{ctrl}$ for the steering of the vehicle, and wherein in the second control intensity the ADAS applies a controller command $U_{final}$ that in part depends on the lane centering control output $u_{ctrl}$.

7. The method of claim 6, wherein the controller command $U_{final}$ equals a weighted sum of the lane centering control output $u_{ctrl}$ and $u_d$, the steering input, plus an auxiliary term $u_{epsilon}$.

8. The method of claim 6, wherein the controller command $U_{final}$ equals $u_d$, the steering input, multiplied by a factor $K_d$, plus an auxiliary term $u_{epsilon}$.

9. The method of claim 6, wherein the controller command $U_{final}$ equals a weighted sum of the lane centering control output $u_{ctrl}$ and ua, the steering input.

10. The method of claim 1, wherein activating the manual lane biasing mode allows the driver to steer away from the trajectory while the ADAS applies the second torque level against the steering input.

11. The method of claim 10, wherein activating the manual lane biasing mode allows the driver to perform a lane change, wherein the ADAS defines a new trajectory.

12. The method of claim 1, further comprising detecting, after activating the manual lane biasing mode, that the vehicle reaches a threshold distance from the trajectory, and applying, in response to the detection of the threshold distance, a third torque level against the steering input, the third torque level greater than the second torque level.

13. The method of claim 12, wherein the third torque level is higher than the first torque level.

14. The method of claim 1, further comprising subsequently deactivating the manual lane biasing mode and instead activating the full lane centering control mode.

15. The method of claim 14, wherein the deactivation of the manual lane biasing mode and the activation of the full lane centering control mode is performed in response to detecting that the driver is no longer steering the vehicle away from the trajectory.

16. The method of claim 14, wherein the deactivation of the manual lane biasing mode and the activation of the full lane centering control mode is performed in response to detecting that the vehicle is currently traveling toward the trajectory.

17. The method of claim 1, further comprising subsequently deactivating the manual lane biasing mode and instead activating a manual control mode where neither of the manual lane biasing mode or the full lane centering control mode is activated.

18. The method of claim 17, wherein the deactivation of the manual lane biasing mode and the activation of the manual control mode is performed in response to the steering input exceeding a torque threshold.

19. The method of claim 17, wherein the deactivation of the manual lane biasing mode and the activation of the manual control mode is performed in response to the driver deactivating lane centering.

20. A vehicle comprising:
a road wheel;
a steering wheel coupled to the road wheel;
a steering control including an actuator for the road wheel; and
an advanced driver assistance system (ADAS), the ADAS implemented using a processor executing instructions, the ADAS coupled to the steering control and configured to operate in:
a full lane centering control mode in which the ADAS keeps the vehicle centered on a trajectory of a lane regardless of surroundings of the vehicle and applies a first torque level against steering input from a driver; and
a manual lane biasing mode in which the ADAS applies a second torque level against the steering input, the second torque level lower than the first torque level, the manual lane biasing mode allowing the driver to steer away from the trajectory.

* * * * *

UNITED STATES PATENT AND TRADEMARK OFFICE
CERTIFICATE OF CORRECTION

| | | |
|---|---|---|
| PATENT NO. | : 12,428,059 B2 | Page 1 of 1 |
| APPLICATION NO. | : 18/449379 | |
| DATED | : September 30, 2025 | |
| INVENTOR(S) | : Harish et al. | |

It is certified that error appears in the above-identified patent and that said Letters Patent is hereby corrected as shown below:

In the Claims

In Column 13, Claim 9, Line 13, delete "ua," and insert -- $u_d$, --, therefor.

Signed and Sealed this
Eighteenth Day of November, 2025

John A. Squires
*Director of the United States Patent and Trademark Office*